(12) United States Patent
Yamamoto

(10) Patent No.: US 10,627,928 B2
(45) Date of Patent: Apr. 21, 2020

(54) METHOD FOR STYLUS TO DETECT SENSOR CONTROLLER USING REPEATED RECEPTION OF SYMBOLS, STYLUS, AND SENSOR CONTROLLER

(71) Applicant: Wacom Co., Ltd., Saitama (JP)

(72) Inventor: Sadao Yamamoto, Tokyo (JP)

(73) Assignee: Wacom Co., Ltd., Saitama (JP)

(*) Notice: Subject to any disclaimer, the term of this patent is extended or adjusted under 35 U.S.C. 154(b) by 91 days.

(21) Appl. No.: 15/880,106

(22) Filed: Jan. 25, 2018

(65) Prior Publication Data

US 2018/0164905 A1 Jun. 14, 2018

Related U.S. Application Data

(63) Continuation of application No. PCT/JP2016/058254, filed on Mar. 16, 2016.
(Continued)

(51) Int. Cl.
*G09G 5/00* (2006.01)
*G06F 3/038* (2013.01)
(Continued)

(52) U.S. Cl.
CPC .............. *G06F 3/0383* (2013.01); *G06F 3/03* (2013.01); *G06F 3/038* (2013.01);
(Continued)

(58) Field of Classification Search
CPC . G06F 3/02; G06F 3/033; G06F 3/041; G06F 3/045; G06F 3/042; G06F 3/043; G09G 5/00; G09G 5/08; G01R 27/26
See application file for complete search history.

(56) References Cited

U.S. PATENT DOCUMENTS 9,727,166 B2   8/2017  Takeda et al.
10,331,235 B2* 6/2019  Fleck .................... G06F 3/0346
(Continued)

FOREIGN PATENT DOCUMENTS

JP    5-316573 A    11/1993
JP    2007-531938 A 11/2007
(Continued)

OTHER PUBLICATIONS

Extended European Search Report, dated Mar. 13, 2019, for European Application No. 16836828.01-1216 / 3340018, 87 pages.
(Continued)

*Primary Examiner* — Pegeman Karimi
(74) *Attorney, Agent, or Firm* — Seed IP Law Group LLP

(57) ABSTRACT

A method includes: a first transmission step in which a sensor controller sends a first control signal US_c1 including a repetition, by twice or more times, of a known element ("repetitive element") c1; a detection step in which a stylus performs a receiving operation over a reception period having a predetermined time length SRP, determines whether one or more repetitive elements c1 are included in a signal received in the reception period, and detects the sensor controller depending on the result of the determination; and a second transmission step in which the sensor controller sends a second control signal US_c2 including a plurality of bit values not shared with the stylus in advance. The method reduces the amount of electric power consumed by a stylus, which is configured to detect a sensor controller by receiving a signal sent by the sensor controller, before the stylus detects the sensor controller.

23 Claims, 9 Drawing Sheets

Related U.S. Application Data

(60) Provisional application No. 62/207,257, filed on Aug. 19, 2015.

(51) Int. Cl.
  *G06F 3/044* (2006.01)
  *G06F 3/03* (2006.01)
  *G06F 3/041* (2006.01)
  *G06F 3/0354* (2013.01)

(52) U.S. Cl.
  CPC ......... *G06F 3/03545* (2013.01); *G06F 3/041* (2013.01); *G06F 3/044* (2013.01); *G06F 3/0416* (2013.01)

(56) References Cited

U.S. PATENT DOCUMENTS

| | | | |
|---|---|---|---|
| 2011/0148785 A1* | 6/2011 | Oda | G06F 3/03545 345/173 |
| 2011/0193776 A1 | 8/2011 | Oda et al. | |
| 2012/0105362 A1 | 5/2012 | Kremin et al. | |
| 2013/0106760 A1* | 5/2013 | Pedersen | G06F 3/03545 345/174 |
| 2014/0043301 A1* | 2/2014 | Katsurahira | G06F 3/044 345/179 |
| 2014/0078101 A1 | 3/2014 | Katsurahira | |
| 2016/0188016 A1* | 6/2016 | Munakata | G06F 3/0416 345/179 |
| 2016/0320918 A1 | 11/2016 | Hara | |

FOREIGN PATENT DOCUMENTS

| | | |
|---|---|---|
| JP | 2014-63249 A | 4/2014 |
| WO | 2014/185523 A1 | 11/2014 |
| WO | 2015/002203 A1 | 1/2015 |
| WO | 2015/111159 A1 | 7/2015 |

OTHER PUBLICATIONS

International Search Report, dated Apr. 19, 2016, for International Application No. PCT/JP2016/058254, 5 pages (with English translation).

* cited by examiner

PRIOR ART

METHOD FOR STYLUS TO DETECT SENSOR CONTROLLER USING REPEATED RECEPTION OF SYMBOLS, STYLUS, AND SENSOR CONTROLLER

BACKGROUND

Technical Field

The present disclosure relates to a method of a stylus detecting a sensor controller, a stylus, and a sensor controller.

Description of the Related Art

There is known a position detecting device that sends signals from an active stylus (hereinafter simply referred to as "stylus"), which is a position indicator with a built-in power supply device, to a tablet by way of a capacitive coupling with the tablet. At present, the position detecting device of this type performs unidirectional communication in which the stylus sends signals and a sensor controller of the tablet receives the signals. Patent Document 1 discloses an example of such position detecting device.

Patent Document 2 discloses another example of the position detecting device. A stylus according to this example is provided with an electrode and a battery for sending signals, and digitally sends a detected pen pressure. A tablet includes a display unit and a transparent sensor, and is arranged for the transparent sensor to be able to detect both an indicated position and a pen pressure of the stylus and a position touched by a finger.

Patent Document 3 discloses a position detecting device for bidirectionally sending signals through a coupling capacitance formed between a stylus and a sensor controller connected to a sensor. It states in paragraph 0065 that a touch sensor device sends a signal to the stylus and the stylus sends a signal in response to the signal.

PRIOR ART DOCUMENT

Patent Documents

Patent Document 1: PCT Patent Publication No. WO2015/111159
Patent Document 2: Japanese Patent Laid-open No. 2014-63249
Patent Document 3: U.S. Patent Application Publication No. 2013-0106760

BRIEF SUMMARY

Technical Problems

With regard to communication via a coupling capacitance formed between a stylus and a sensor, a sufficient coupling capacitance cannot be formed for effective communication unless the distance between the pen tip and the sensor electrode generally becomes several millimeters or less or several tens of millimeters or less, depending on various factors such as the size, shape, and material of the stylus tip or the sensor electrode, and the transmission voltage. Therefore, unlike the relationship between an input device such as a mouse or the like and a computer, supported by a wireless communication system such as Bluetooth® (registered trademark) or the like in which they are capable of detecting each other in a range of several meters or several tens of meters and maintaining their communication, the stylus and the sensor are unable to detect each other until when the user operate the stylus to bring it closer to the sensor.

A detecting process as depicted in FIG. 10, to be described below, may be conceived as a method of communication between a stylus and a sensor which have the above characteristics. However, such a detecting process may be problematic in that a large amount of electric power is consumed by the stylus before it detects a sensor controller. Details of the problem will hereinafter be described.

FIG. 10 is a diagram illustrative of a process of detecting a sensor controller in a bidirectional communication system according to the background art of the present disclosure. As indicated by Tx in FIG. 10, the sensor controller is configured to send to a stylus, which has entered a sensing range, beacon signals BS including control information (command) not shared in advance with the stylus, intermittently at constant transmission periods TP. On the other hand, the stylus performs a receiving operation intermittently until it detects the sensor controller. Specifically, the stylus activates a receiving circuit at intervals (e.g., intervals such as several times per second) represented by a predetermined time length WP to successively perform a receiving operation to obtain regular information during a reception period of a predetermined time length RP (<WP). The stylus performs the receiving operation intermittently in order to reduce a receiving operation to cut down on the consumption of electric power while the stylus is not in use in the detecting range of the sensor, such as when the stylus is set aside of an electronic device.

In the above system, in order to guarantee that the stylus detects control information included in the beacon signals BS during the reception period of the predetermined time length RP after having started the receiving operation, the predetermined time length RP should be longer than the transmission period TP (RP>TP). This is because if the predetermined time length RP is shorter than the transmission period TP, then depending on the timing of the stylus starting the receiving operation, the predetermined time length RP may elapse and the receiving process may end before the stylus detects a beacon signal B S sent from the sensor controller. Therefore, it is desirable for the stylus 100 to keep the receiving circuit activated during the successive reception time period RP longer than the transmission period TP. The ratio of the time period during which the stylus performs the receiving operation to the total time period may be indicated as RP/WP.

The stylus, due to the limitation posed by the size of its housing, tends to have a power supply capacity that is smaller than the sensor controller, which is able to share a power supply used to energize an electronic computer. If the electric power consumed by the stylus increases, then the time period in which the user can use the system decreases. In particular, the stylus that performs a receiving operation in synchronism with the transmission side has to operate at a high speed, compared with the transmission rate of signals from the transmission side, in performing digital demodulating processes such as AD conversion, waveform regeneration, resulting in that the time length RP of the reception period has to be significantly increased. This requires that the stylus reduce its electric power consumption before a point in time when the stylus detects the sensor controller.

A reduction in the electric power consumed by the stylus can be realized by extending the interval during which the stylus activates the receiving circuit (i.e., by increasing the predetermined time length WP). However, doing so increases a maximum value (maximum waiting time period)

of the time period (response time period) required before the stylus and the sensor controller can complete detecting each other after the stylus has approached the sensor controller. The state in which the stylus is approaching the sensor controller is highly likely to be the state in which the user has actually started the operation to use the stylus (has performed a pen-down operation) and, also from the standpoint of accelerating the start of a process of displaying a position indicated by the stylus and a graphic process, it is desirable to shorten the time period spent before the stylus detects the sensor controller and sends signals in response to the detection.

Consequently, there is a need for a method of reducing the amount of electric power consumed by the stylus, which is configured to detect the sensor controller by receiving a signal sent by the sensor controller, before the stylus detects the sensor controller, while maintaining a response time period required for the stylus to detect the sensor controller reasonably short.

Technical Solution

According to an embodiment of the present disclosure, there is provided a method of a stylus detecting a sensor controller in a system which includes the stylus and the sensor controller for sending signals via a capacitive coupling. The method includes: a first transmission step in which the sensor controller sends a first control signal including two or more repetitions of a known repetitive element; a detection step in which the stylus performs a receiving operation over a reception period having a predetermined time length, determines whether the repetitive element is included in a signal received in the reception period, and detects the sensor controller depending on the result of the determination; and a second transmission step in which the sensor controller sends a second control signal including bit values that are not shared with the stylus in advance.

According to an embodiment of the present disclosure, there is provided a stylus for performing communication with a sensor controller via a coupling capacitance, in which the sensor controller sends a signal to the stylus during a continuous transmission period. The stylus includes a receiver that receives the signal over a reception period which is longer than the length of N (N is an integer of 1 or larger) symbols and shorter than the continuous transmission period, determines whether the received signal includes one repetitive element, which is formed of values of the N symbols and which is shared with the sensor controller in advance, successively receives the signal over the reception period, at constant intervals, if the repetitive element is not included, and issues an activation signal if the repetitive element is included. The stylus includes a controller that performs processing to send a signal to the sensor controller in response to the activation signal.

According to an embodiment of the present disclosure, there is provided a sensor controller which uses a sensor connected thereto for sending control information to a stylus via a capacitive coupling between the sensor and the stylus, and for receiving a signal sent from the stylus in response to the control information. The stylus performs a receiving operation in a predetermined period, determines whether one pattern of the symbol values is included in a signal received in the reception period, and detects the sensor controller depending on the result of the determination. The sensor controller includes a transmitter for generating and sending a control signal based on the value of the supplied symbol. The sensor controller controls the transmitter to send N (N is an integer of 1 or larger) symbols, shared with the stylus in advance, repeatedly over a period longer than the predetermined period.

Advantageous Effects

According to an embodiment of the present disclosure, the sensor controller sends the repetitive element repeatedly twice or more times, and the stylus detects the sensor controller by detecting one of the repeated repetitive elements. Therefore, the time period in which the stylus has to carry out the receiving operation can be shortened, reducing the ratio of the receiving operation execution time period to the overall time period. Consequently, the amount of electric power consumed by the stylus, which is configured to detect the sensor controller by receiving a signal sent by the sensor controller, before it detects the sensor controller is reduced, while maintaining a response time period required for the stylus to detect the sensor controller reasonably short.

BRIEF DESCRIPTION OF THE SEVERAL VIEWS OF THE DRAWINGS

FIG. 7A is a flowchart depicting an operation sequence of the sensor controller 31, and FIG. 7B is a flowchart depicting an operation sequence of the stylus 100.

FIG. 9A is a flowchart depicting an operation sequence of the sensor controller 31, and FIG. 9B is a flowchart depicting an operation sequence of the stylus 100.

DETAILED DESCRIPTION

An embodiment of the present disclosure will be described in detail below with reference to the accompanying drawings.

Figure 1:
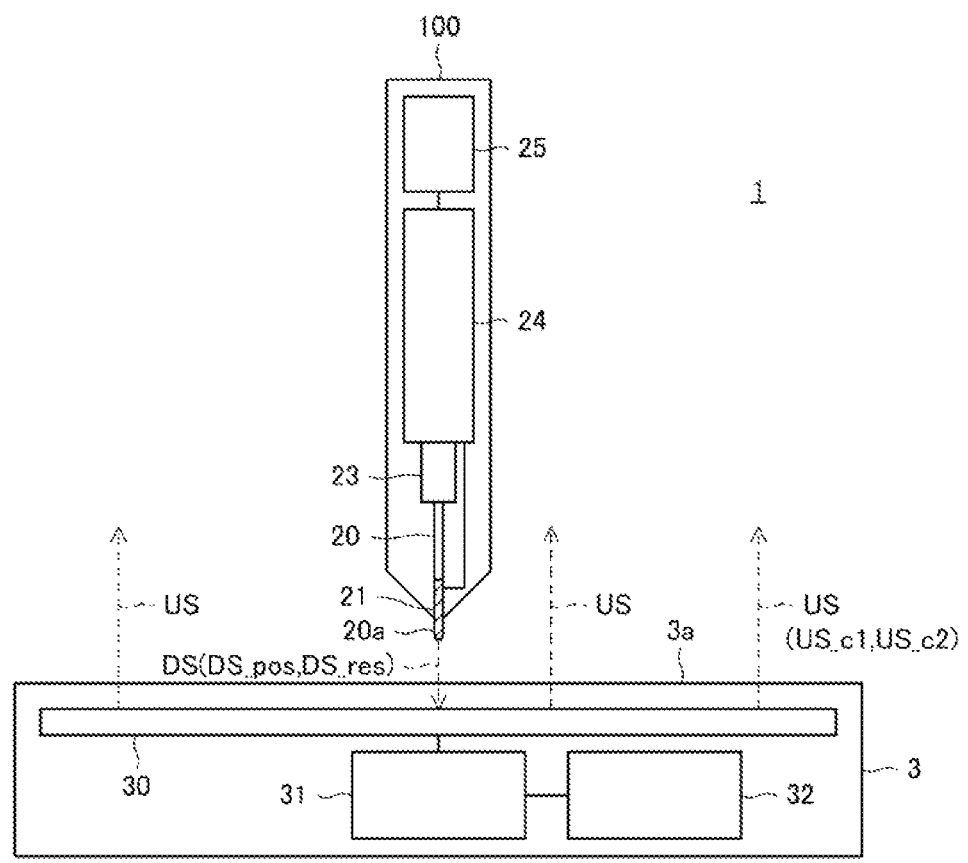
FIG. 1 is a diagram depicting an arrangement of a system 1 according to an embodiment of the present disclosure.

FIG. 1 is a diagram depicting an arrangement of a system 1 according to the present embodiment. The system 1 includes a stylus 100 and a sensor controller 31 provided in an electronic device 3.

As depicted in FIG. 1, the stylus 100 includes a core body 20, an electrode 21, a pen pressure detection sensor 23, a circuit board 24, and a power supply 25. A cylindrical AAAA cell, for example, is used as the power supply 25.

The core body 20 is a rod-shaped member disposed such that its longitudinal direction is aligned with the pen axis direction of the stylus 100. The core body 20 has a distal end 20a whose surface is coated with an electrically conductive material, providing the electrode 21. The core body 20 has a proximal end held against the pen pressure detection sensor 23. The pen pressure detection sensor 23 is used to detect a pressure (pen pressure) applied to the distal end 20a of the core body 20.

The stylus 100 has a function to send downlink signals DS to the electronic device 3 through a coupling capacitance in such a manner that signal changes are associated with electric field changes, as is the case with the active stylus disclosed in Patent Document 1. The electrode 21 serves as an antenna for realizing the sending of signals. The downlink signals DS include a position signal DS_pos and a data signal DS_res, as described in detail later. The electrode 21 of the stylus 100 also serves as an antenna for receiving control signals US sent from the sensor controller 31 through the coupling capacitance.

The electronic device 3 has a sensor 30 that provides a touch surface, the sensor controller 31, and a host processor 32 that controls the functions of various parts of the electronic device 3 which include the sensor 30 and the sensor controller 31.

The sensor controller 31 has a function to send the control signals US to the stylus 100 via the sensor 30. The control signals US include a first control signal US_c1 and a second control signal US_c2, as described in detail later.

The present disclosure is concerned with a method of the stylus 100 detecting the sensor controller 31 in the system 1 arranged as described above. As described in detail later with reference to FIG. 4, in order to cut down on electric power consumption, the stylus 100 disables a reception operation of a receiver 71, except for shortened reception periods SRP, during a pre-detection period BD before the stylus 100 detects the sensor controller.

Figure 2:
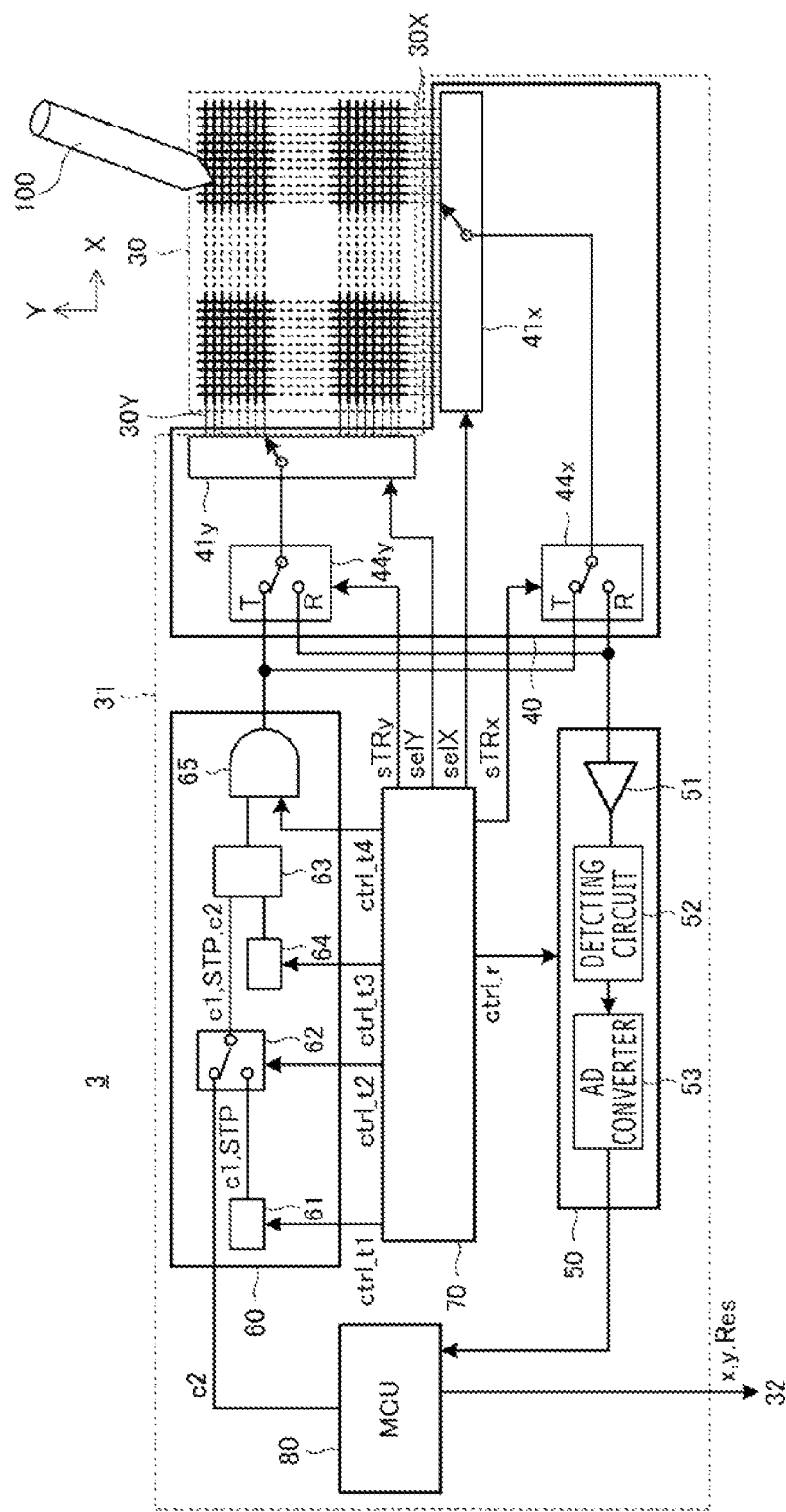
FIG. 2 is a diagram depicting an arrangement of an electronic device 3 depicted in FIG. 1.

FIG. 2 is a diagram depicting an arrangement of the electronic device 3. The electronic device 3 includes the sensor 30, the sensor controller 31, and the host processor 32 that controls operation of the electronic device 3 in its entirety. The sensor 30 includes a matrix of line-shaped electrodes 30X and line-shaped electrodes 30Y, and is capacitively coupled to the stylus 100 through the line-shaped electrodes 30X and 30Y. The sensor controller 31 has a transmitter 60, a selecting section 40, a receiver 50, a logic unit 70, and an MCU 80.

The transmitter 60 is a circuit for sending the control signals US (the first control signal US_c1 and the second control signal US_c2) depicted in FIG. 1 based on supplied data (the values of symbols to be described later) during a specified transmission period. Specifically, the transmitter 60 includes a first control signal supply circuit 61, a switch 62, a modulation circuit (direct spread section) 63, a spread code hold section 64, and a transmission guard section 65.

Figure 4:
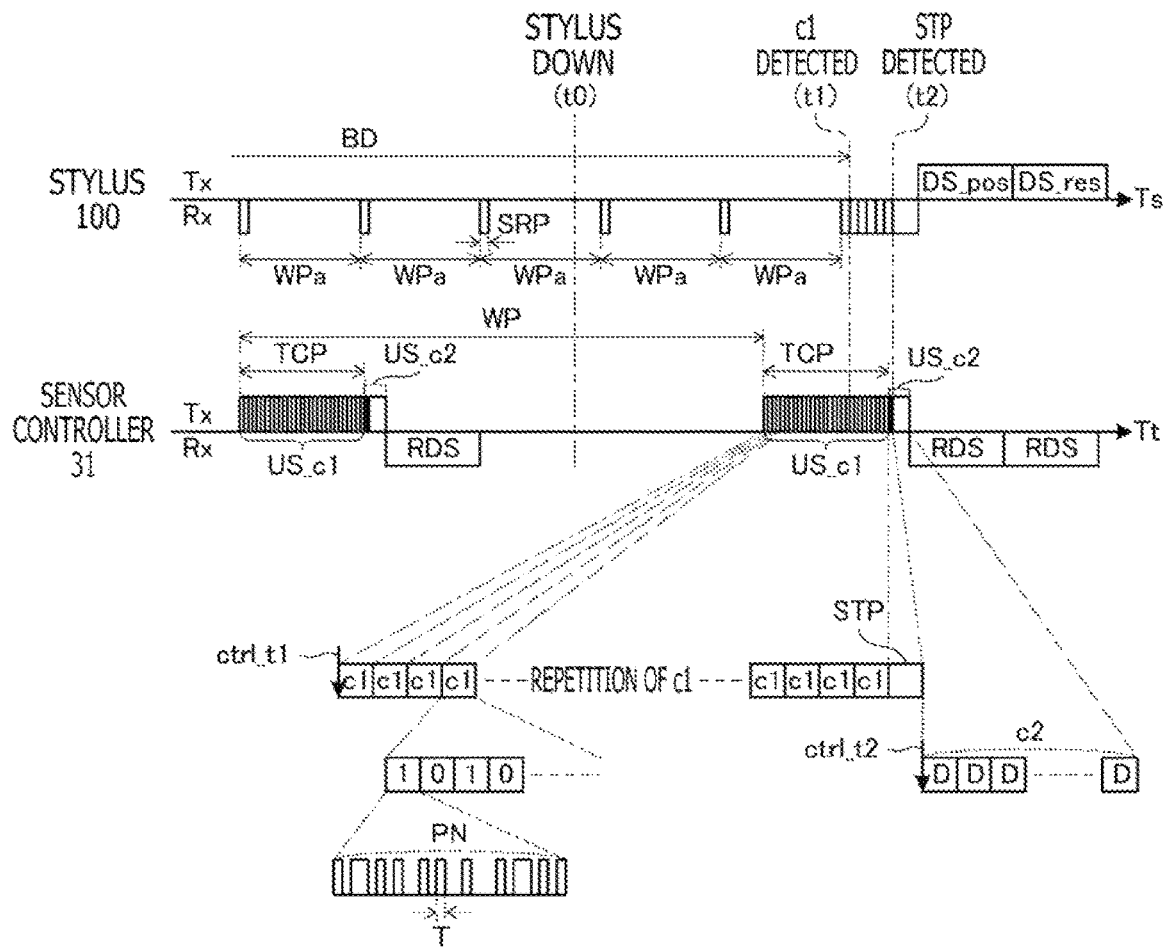
FIG. 4 is a timing chart illustrative of a chronological sequence of operations of the stylus 100 and a sensor controller 31 depicted in FIG. 1.

The first control signal supply circuit 61 holds a repetitive element c1 which is an element including a pattern of values, and has a function to repeatedly output the repetitive element c1 continuously M times (M is an integer of 2 or larger) during a continuous transmission period TCP (e.g., 3 msec.) depicted in FIG. 4, as instructed by a control signal ctrl_t1 supplied from the logic unit 70. The first control signal supply circuit 61 also has a function to output a predetermined delimiter element STP immediately after the end of the continuous transmission period TCP.

The repetitive element c1 includes a pattern of the values of symbols used for the stylus 100 to detect the existence of the sensor controller 31, and includes values of N (N is an integer of 1 or larger) symbols that are already known to the stylus 100 in advance (before the stylus 100 detects the sensor controller 31). A symbol is a unit of information used for modulation in a sending process, and a unit of information obtained by demodulating one symbol in a receiving process. According to the present embodiment, a symbol will be described as a unit of information represented by the polarity or phase of one spread code.

The length of one symbol corresponds to the time period (transmission time period or reception time period) of a signal in the unit of the information. The length of N symbols is the time period of a signal that includes N units of the information. One symbol may represent a value of one bit or may represent multiple values. If one symbol represents multiple values, then it may represent the values of a predetermined number of bits (e.g., the values of as many bits as a power of 2, denoted by "D" for the sake of convenience), or, in addition to values "D" of a predetermined number of bits, one or more values which do not correspond to any of the values of a predetermined number of bits (which are not provided for binary string conversion used by the MCU). According to the present disclosure, the "one or more values" may be two values denoted as "P" and "M," respectively, for the sake of convenience. "P" and "M" are used only in the repetitive element c1 and the delimiter element.

N symbols that make up the repetitive element c1 may represent first values that are identical to each other or may include a plurality of symbols representing values different from each other. For example, when one symbol represents a value of one bit, N (N=2) symbols that represent first values "11" (or "00") identical to each other may make up the repetitive element c1, or N (N=2) symbols that includes "10" (or "01") including a symbol representing "1" and a symbol representing "0," which are different from each other, may make up the repetitive element c1.

Furthermore, when one symbol represents multiple values and includes "P" and "M" referred to above, values not corresponding to these particular values, e.g., "PM" (or "MP"), may be used to make up the repetitive element c1. In this manner, when the values of two successive arbitrary symbols are decoded, the presently received signal can be decided as the first control signal because "the values of the decoded two symbols are different from each other" regardless of whether they are "MP" or "MP."

N may be N=1 (e.g., the repetitive element c1 is "1"). In this case, it is possible to minimize the minimum time period required for the stylus 100 to capture the repetitive element c1 (i.e., the time in the pre-detection period BD during which the receiver 71 remains activated; in this example in which the repetitive element c1 is "1" symbol long, the time required to remain activated to detect the repetitive element c1 corresponds to twice the symbol length of the repetitive period c1, i.e., the required time is "2" symbol long). As a result, the minimum time period to detect the repetitive element c1 of N=1 becomes shorter than the shortened reception period SRP depicted in FIG. 4. If N=2, then the required reception period increases to the time length corresponding to twice the "2" symbol length of the repetitive period c1, i.e., the required time becomes "4" symbol long.

By decoding the values of any two successive symbols, the stylus can determine the presently received control signal as the first control signal.

The delimiter element STP is a symbol pattern for notifying the stylus 100 of the end of the continuous transmission period TCP, and includes a pattern of symbols that do not appear in the repetition of the repetitive element c1. For example, as described above, if one symbol represents a value of one bit and N (N=2) symbols that represent first values "11" (or "00") identical to each other make up the repetitive element c1, the delimiter element STP should preferably be made up of values including a symbol representing a second value "0" different from the first value "1" (either "01," "10," or "00"). In addition, as described above, if one symbol represents multiple values and N symbols in the repetitive element c1 are made up of an alternate repetition of "P" and "M," the delimiter element STP should preferably be made up of symbols representing the same value (e.g., "P"), e.g., "PP" or "MM." The number of symbols making up the delimiter element STP may be equal to the number of symbols making up the repetitive element c1.

The switch 62 has a function to select either the first control signal supply circuit 61 or the MCU 80 on the basis of a control signal ctrl_t2 supplied from the logic unit 70, and supplies an output signal from the selected circuit to the modulation circuit (direct spread section) 63. If the switch 62 selects the first control signal supply circuit 61, then the modulation circuit (direct spread section) 63 is supplied with the above repetitive element c1 or the delimiter element STP. If the switch 62 selects the MCU 80, then the modulation circuit (direct spread section) 63 is supplied with control information c2.

The control information c2 is a symbol pattern including a command that represents the content of an instruction for the stylus 100, and is generated by the MCU 80. The control information c2 corresponds to the beacon signals BS including control information (command) described above in Background Art, and is different from the repetitive element c1 in that the control information c2 is information including a plurality of symbols whose values are not shared in advance with the stylus 100. From the standpoint of simplifying the decoding of the control information c2 in the stylus 100, the values each represented by the respective symbols not shared in advance should preferably not be particular values (bit string) indicated by "P" and "M" described above, but preferably can be values of a predetermined number of bits each indicated by "D." The control information c2 makes up a command for instructing the stylus 100 to operate with the values of the predetermined number of bits. The command includes, for example, the content of information to be sent by the stylus 100, the timing at which the stylus 100 sends a signal, the frequency at which the stylus 100 sends a signal, or the like.

The spread code hold section 64 has a function to generate a spread code PN (predetermined code train) on the basis of a control signal ctrl_t3 supplied from the logic unit 70. The spread code PN generated by the spread code hold section 64 is supplied to the modulation circuit (direct spread section) 63.

The modulation circuit (direct spread section) 63 is a functional block for generating and outputting the first control signal US_c1 and the second control signal US_c2 referred to above by changing the output pattern of the spread code PN supplied from the spread code hold section 64 with the values of the symbols of the signals (the repetitive element c1, the delimiter element STP, and the control information c2) supplied from the switch 62. Specifically, the modulation circuit (direct spread section) 63 generates the first control signal US_c1 by changing the polarity (non-inverted or inverted, or cyclic shift quantity if one symbol represent multiple values) of the spread code PN on the basis of the respective values of one or more symbols that make up a series of repetitive elements c1 that are repeatedly supplied during the continuous transmission period TCP, and generates the second control signal US_c2 by changing the polarity, etc., of the spread code PN depending on the values of a plurality of symbols making up each of the delimiter element STP and the control information c2 supplied subsequently thereto. Though the number of chips making up one spread code PN is arbitrary, depending on the rate of the chips, the frequency spectrums of the first control signal and the second control signal to be sent can be spread to increase the noise resistance of the control signals.

The modulation circuit (direct spread section) 63 may Manchester-encode each of the chips making up the first control signal US_c1 and the second control signal US_c2.

The transmission guard section 65 has a function to insert a guard period, which is a period in which neither transmission nor reception is carried out in order to switch between a transmitting operation and a receiving operation, between a transmission period for the first control signal US_c1 and the second control signal US_c2 and a reception period RDS to be described later on the basis of control signal ctrl_t4 supplied from the logic unit 70.

The selecting section 40 is a switch for switching between the transmission period in which the sensor 30 sends signals and the reception period in which the sensor 30 receives signals, under the control of the logic unit 70. Specifically, the selecting section 40 includes switches 44x and 44y and conductor selecting circuits 41x and 41y. Based on a control signal sTRx supplied from the logic unit 70, the switch 44x operates to connect the output terminal of the transmitter 60 to the input terminal of the conductor selecting circuit 41x during the transmission period and to connect the output terminal of the conductor selecting circuit 41x to the input terminal of the receiver 50 during the reception period. Based on a control signal sTRy supplied from the logic unit 70, the switch 44y operates to connect the output terminal of the transmitter 60 to the input terminal of the conductor selecting circuit 41y during the transmission period and to connect the output terminal of the conductor selecting circuit 41y to the input terminal of the receiver 50 during the reception period. Based on a control signal selX supplied from the logic unit 70, the conductor selecting circuit 41x operates to select one of the line-shaped electrodes 30X and to connect the selected line-shaped electrode 30X to the switch 44x. Based on a control signal selY supplied from the logic unit 70, the conductor selecting circuit 41y operates to select one of the line-shaped electrodes 30Y and to connect the selected line-shaped electrode 30Y to the switch 44y.

The receiver 50 is a circuit for detecting or receiving the position signal DS_pos and the data signal DS_res sent by the stylus 100 on the basis of control signal ctrl_r from the logic unit 70. Specifically, the receiver 50 includes an amplifying circuit 51, a detecting circuit 52, and an analog-to-digital (AD) converter 53.

The amplifying circuit 51 amplifies and outputs the position signal DS_pos and the data signal DS_res supplied from the selecting section 40. The detecting circuit 52 is a circuit for generating a voltage commensurate with the level of an output signal from the amplifying circuit 51. The AD converter 53 is a circuit for generating a digital signal by sampling the voltage output from the detecting circuit 49 at predetermined time intervals. The digital data output by the AD converter 53 are supplied to the MCU 80.

The MCU 80 is a microprocessor that has a read-only memory (ROM) and a random access memory (RAM) thereinside and that operates according to programs for the method according to the present disclosure. The logic unit 70 outputs the control signals described above under the control of the MCU 80. The MCU 80 also derives coordinate data x, y indicating the position of the stylus 100 on the basis of digital data supplied from the AD converter 53 and outputs the derived coordinate data x, y, etc., to the host processor 32.

In this manner, the MCU 80 performs a control process for sending the first control signal US_c1 that includes a signal where N (N is an integer of 1 or larger) symbols whose values are shared with the stylus in advance are repeated M times, using the logic unit 70 and the transmitter 60.

The MCU 80 also performs a control process for sending the second control signal US_c2, as a signal representing a command to the stylus, that includes symbols not shared with the stylus in advance.

The sensor controller 31 and the stylus 100 respective store in advance an associating relationship between a plurality of commands and values (or bit strings), wherein the values differ from each other from command to command. The MCU 80 of the sensor controller 31 is arranged such that after it has decided on a command to be sent, it acquires a bit string corresponding to the decided command from the associating relationship and outputs the acquired bit string as the control information c2.

Figure 3:
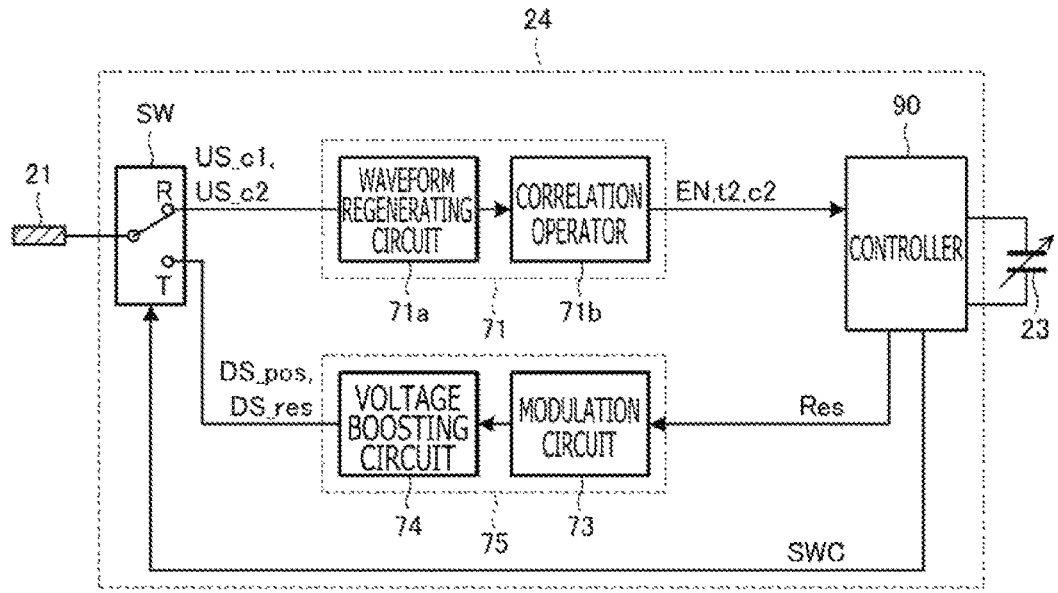
FIG. 3 is a block diagram depicting functional blocks of a stylus 100 depicted in FIG. 1.

FIG. 3 is a block diagram depicting functional blocks of the stylus 100. As depicted in FIG. 3, the stylus 100 includes a switch SW, a receiver 71, a transmitter 75, and a controller 90.

The switch SW is a switch for switching between reception R and transmission T on the basis of a control signal SWC from the controller 90. The switch SW connects the electrode 21 to the receiver 71 during the reception R and connects the electrode 21 to the transmitter 75 during the transmission T. The switch SW is set to the reception R side in an initial state, i.e., during the pre-detection period BD before the stylus 100 detects the first control signal US_c1.

The receiver 71 is a circuit for receiving a signal (a signal arriving at the electrode 21) supplied from the switch SW and decoding the values of symbols included in the received signal during the reception period indicated by the controller 90. The receiver 71 includes a waveform regenerating circuit 71a and a correlation operator 71b. In order to reduce electric power consumption, the receiver 71 is disabled in its operation except for the shortened reception periods SRP, during the pre-detection period BD before the stylus 100 detects the sensor controller 31.

Operation of the receiver 71 will be described also with reference to FIG. 4. The receiver 71 operates to receive the first control signal US_c1 (the repetitive element c1) in the shortened reception periods SRP, which are shorter than the reception period RP described with reference to FIG. 10, during respective predetermined periods WPa (e.g., 2.5 msec.), thereby detecting the repetitive element c1 sent by the sensor controller 31. The receiver 71 performs the detecting operation by determining whether one repetitive element c1 is included in a signal received in the shortened reception period SRP indicated by the controller 90 or not.

Each shortened reception period is a period longer than the time length of one repetitive element c1 (the length of N symbols) and shorter than the time length of the first control signal US_c1 (the length of N symbols multiplied by M) during the time period Wpa. As described above, to secure the time required to detect one repetitive element regardless of the particular timing at which it is sent by the sensor controller 31, the reception period is set longer than the length of 2 (N) symbols included in the repetitive element c1.

The stylus 100 tries to detect the sensor controller 31 in this manner. After having detected the sensor controller 31, the receiver 71 continues its receiving operation and performs a process of receiving the second control signal US_c2. Specifically, the receiver 71 initially receives the delimiter element STP positioned at the beginning of the second control signal US_c2 and then receives the control information c2.

Operation of the parts of the receiver 71 will be described in specific detail below. The waveform regenerating circuit 71a has a function to binarize the level of the electric charge (voltage) induced in the electrode 21 with a clock CLK that is several times (e.g., four times) the chip rate of the spread code PN, to shape the binarized level into a binary string (corresponding to the chip string of the PN code) having positive and negative polarity values, and to output the binary string.

The correlation operator 71b stores the binary string of positive and negative polarity values output from the waveform regenerating circuit 71a in a register array, performs a correlation operation on the binary string and the spread code PN corresponding to the values of the symbols from the sensor controller 31 which have been shared and known in advance, while successively shifting the binary string with the clock CLK, thereby decoding the values of the symbols included in the received signal, and outputs the decoded values.

Specifically, when the repetitive element c1 is made up of one symbol only (e.g., when a symbol "1" is determined in advance as the content of the repetitive element c1), as described above, the correlation operator 71b detects the existence of the sensor controller 31 by detecting the one symbol once. When the repetitive element c1 is made up of a plurality of symbols (e.g., when N=2 as the content of the repetitive element c1, and a pattern "MP" or "PM" is determined in advance as the values of the symbols), the correlation operator 71b detects the existence of the sensor controller 31 by detecting these symbols once. Having detected the sensor controller 31, the correlation operator 71b issues an activation signal EN to the controller 90 for performing various processing operations to send signals to the sensor controller 31, such as a process depending on the command included in the second control signal US_c2.

Furthermore, if the repetitive element c1 is detected, then the correlation operator 71b continues a decoding process of decoding the received signal (between time t1 and time t2 in FIG. 4) and determines whether the delimiter element STP is included in the received signal or not. If the delimiter element STP is detected at time t2 as a result, then the correlation operator 71b outputs detected time t2 to the controller 90.

The correlation operator 71b receives the second control signal US_c2 according to scheduling from the controller 90, decodes the control information c2 (including a plurality of unknown bit values of "0" or "1"), and outputs the decoded control information c2 to the controller 90.

The controller 90 includes a microprocessor (MCU), and is activated when it is supplied with the activation signal EN from the receiver 71 (i.e., when the receiver 71 detects one repetitive element c1), and performs various processes for sending signals to the sensor controller 31. Specifically, based on the detected time t2 supplied from the receiver 71, the controller 90 generates a transmission and reception schedule for various signals (the control information c2, the position signal DS_pos, and the data signal DS_res). Then, the controller 90 performs a process of generating control signals SWC based on the generated transmission and reception schedule and supplying the generated control signals SWC to the switch SW, and a process of controlling a method of sending the data signal DS_res on the basis of control information c2 supplied from the receiver 71.

The controller 90 also stores the associating relationship between a plurality of commands included in the control signal $US_{13}$ c2 and the values of symbols, which differ from each other from command to command, and performs an operation based on the values of the symbols (the values of a plurality of bits) supplied from the receiver 71.

The process of controlling the method of sending the data signal DS_res will be described in detail below. If the contents of information to be sent (pen ID, a pen pressure value, and the state in which a side switch is pressed, etc.) are specified by the control information c2, then the controller 90 controls the contents of information to be sent to the electronic device 3 according to the specified contents. Specifically, the controller 90 generates transmission data Res including the information to be sent and supplies the generated transmission data Res to the transmitter 75. If the transmission timing to send the data signal DS_res (e.g., a time slot used to send the data signal DS_res) is specified by the control information c2, then the controller 90 controls the timing to supply the transmission data Res to the transmitter 75 so that the data signal DS_res will be sent at the transmission timing. Furthermore, if the frequency used to send the data signal DS_res is specified by the control information c2, then the controller 90 controls a modulation circuit 73 to be described later in order to generate a carrier signal having the specified frequency.

If the receiver 71 has not detected the repetitive element c1, i.e., if the receiver 71 has completed the above processes in response to the previous activation signal EN supplied thereto, but has not yet been supplied with a next activation signal EN, then the controller 90 may be brought into a state in which the above processes are disabled (i.e., the controller 90 operates in a low electric power consumption mode). In this fashion, the electric power consumption of the controller 90 can be reduced.

The transmitter 75 is a circuit configured to send the position signal DS_pos and the data signal DS_res, and includes a modulation circuit 73 and a voltage boosting circuit 74.

The modulation circuit 73 is a circuit for generating a carrier signal (e.g., a rectangular-wave signal) having a predetermined frequency or a frequency controlled by the controller 90, and outputting the carrier signal as it is or after modulating it under the control of the controller 90. When the position signal DS_pos is to be sent, the modulation circuit 73 does not modulate the carrier signal and outputs the carrier signal as it is. When the data signal DS_res is to be sent, the modulation circuit 73 modulates the carrier signal with transmission data Res supplied from the controller 90 (by way of OOK, PSK, or the like), and outputs the modulated signal obtained as a result.

The voltage boosting circuit 74 is a circuit for boosting the voltage of output signals from the modulation circuit 73 to a certain amplitude thereby to generate the position signal DS_pos and the data signal DS_res. The position signal DS_pos and the data signal DS_res that have been generated by the voltage boosting circuit 74 are supplied via the switch SW to the electrode 21, from which they are delivered into space.

Figure 5A:
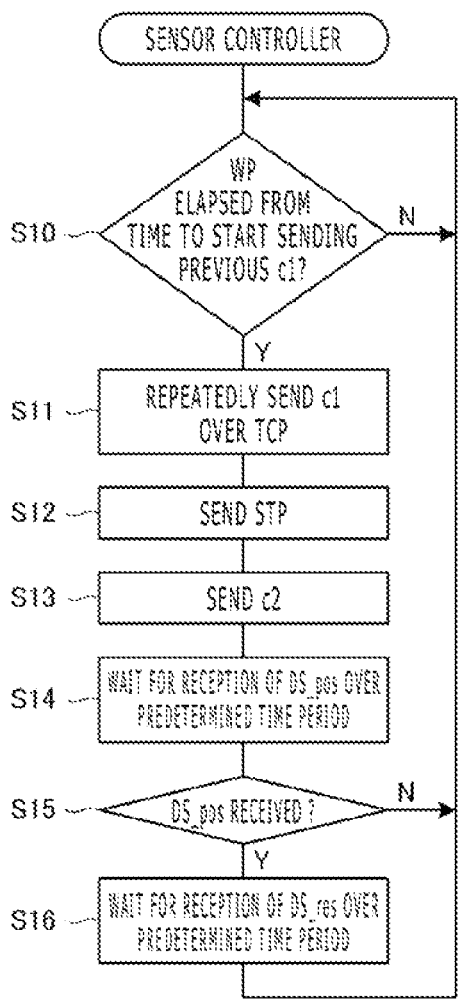
FIG. 5A is a flowchart depicting an operation sequence of the sensor controller 31 depicted in FIG. 1.
Figure 5B:
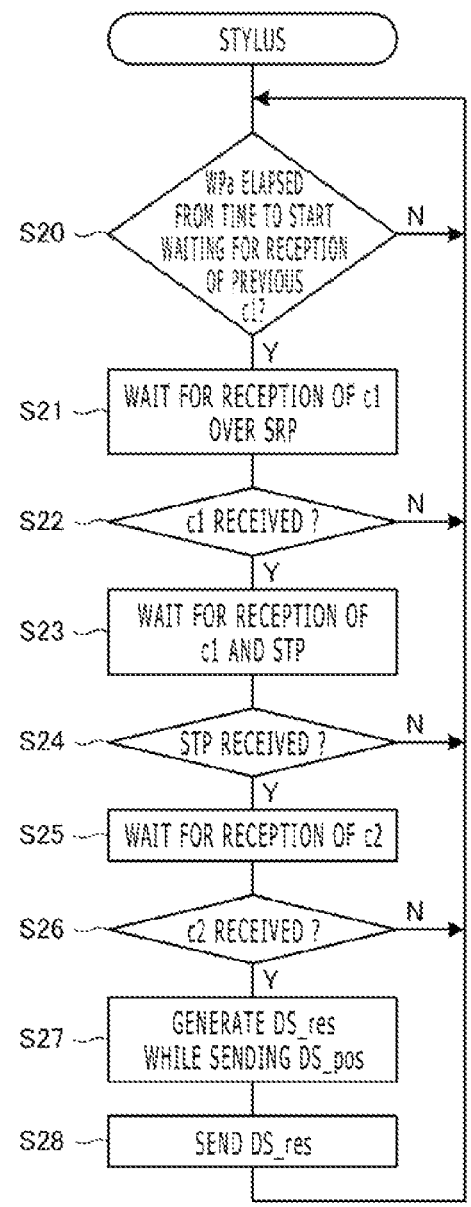
FIG. 5B is a flowchart depicting an operation sequence of the stylus 100 depicted in FIG. 1.

FIG. 4 is a timing chart illustrative of a chronological sequence of operations of the stylus 100 and the sensor controller 31. FIG. 5A is a flowchart depicting an operation sequence of the sensor controller 31, and FIG. 5B is a flowchart depicting an operation sequence of the stylus 100. In FIG. 4, a time axis indicated at an upper section Ts represents transmission Tx and reception Rx of the stylus 100, and a time axis indicated at a lower section Tt represents transmission Tx and reception Rx of the sensor controller 31. Operations of the stylus 100 and the sensor controller 31 will be described in detail below with reference to FIGS. 4, 5A, and 5B.

<1. Operation During the Pre-Detection Period BD>
(1-1: Before Time t0)

In FIG. 4, a period up to time t0 is a period in which the stylus 100 is outside a detecting range of the sensor controller 31. In order to reduce the electric power consumption, the stylus 100 operates the receiver 71 intermittently a plurality of times in periods WPa shorter than the continuous transmission period TCP (steps S20 and S21 in FIG. 5B). Specifically, in each of the periods WPa, the stylus 100 operates the receiver 71 only during the shortened reception period SRP for detecting one repetitive element c1, and disables the receiver 71 for the rest of the time in WPa. The time length of the reception period SRP is set to a value that is necessary and sufficient to receive the repetitive element c1 once (e.g., a time period longer than the length 2 N of two symbols included in the repetitive element c1, but shorter than the length of symbols included in a signal in which the repetitive element c1 is repeated M times).

The sensor controller 31 is configured to repeat the transmission of the first control signal US_c1 and the second control signal US_c2 in a period WP (steps S10 through S13 in FIG. 5A). As described above, the first control signal US_c1 is a signal including a repetition of repetitive elements c1, and the second control signal US_c2 is a signal including the delimiter element STP and the control information c2.

Specifically, as the period WP starts, the sensor controller 31 repeats the transmission of a signal where the repetitive element c1 is spread by the spread code PN, over the continuous transmission period TCP that is longer than the period WPa. The repetition is carried out at least twice. The number M of repetitions is provided by dividing the continuous transmission period TCP by the length of N symbols included in the repetitive element c1. For example, if the continuous transmission period TCP is 1 millimeter, the N number of symbols included in the repetitive element is 2, and the length of one symbol is 20 μseconds, then M representing the number of repetitions is approximately 25.

A preferred value for the number (M) of repetitions of the repetitive element c1 will hereinafter be described. In order for the stylus 100 to be able to receive one repetitive element c1 while the sensor controller 31 is continuously sending the repetitive element c1, the stylus 100 needs to perform a receiving operation to receive the repetitive element at least once during the time length TCP. Therefore, WPa≤TCP (Equation 1). If it is assumed that the number of repetitions of the repetitive element c1 is M described above and the time period required to send one repetitive element c1 is t, then TCP=Mt. Hence, M≥WPa/t (Equation 2) from Equation 1.

Since the time required to receive one repetitive element is SRP, the ratio of the receiving operation execution time period of the stylus 100 to the total time period is SRP/WPa. In order to make the electric power consumption of the stylus 100 smaller compared with Background Art depicted in FIG. 10, SRP/WPa has to be smaller than RP/WP. Therefore, SRP/WPa<RP/WP (Equation 3).

From Equation 2 and Equation 3, M>(SRP/t)/(RP/WP). Consequently, in order to make the electric power consumption of the stylus 100 smaller compared with Background Art depicted in FIG. 10, it is preferable that the number M of repetitions be of a value larger than (SRP/t)/(RP/WP). Because the sensor controller 31 sends the first control signal US_c1 in the period WP, a response time period (maximum waiting time period) required before the stylus 100 and the sensor controller 31 complete each other's detection after the stylus 100 starts to approach the sensor controller 31 is of the same value as with the example depicted in FIG. 10. According to the present embodiment, therefore, with the number M of repetitions being of a value larger than (SRP/t)/(RP/WP), the amount of electric power consumed by the stylus 100, which is configured to detect the sensor controller 31 by receiving a signal sent by the sensor controller 31, before it detects the sensor controller 31 is reduced, while the maximum waiting time period is kept equal to or smaller than the conventional value.

Having repeatedly sent the repetitive element c1 over the continuous transmission period TCP, the sensor controller 31 then sends the second control signal US_c2. Specifically, the sensor controller 31 initially sends a signal where the delimiter element STP is spread by the spread code PN and then sends a signal where the control information c2 is spread by the spread code PN. As described above, the control information c2 is a symbol pattern including a command. In FIG. 4, "D" represents a symbol representing a numerical value (not "P" and "M" described above).

The sensor controller 31 that has completed the transmission of the second control signal US_c2 provides a reception period RDS (step S14 in FIG. 5A) for receiving a signal from the stylus 100. In case the stylus 100 has received the first control signal US_c1 sent as described above, the stylus 100 sends the position signal DS_pos in the reception period RDS. During the reception period RDS, the sensor controller 31 waits for the reception of the position signal DS_pos thus sent.

(1-2. Time t0 to Time t1)

Upon movement of the stylus 100 into the detecting range of the sensor 30 at time t0 (stylus-down), the stylus 100 detects the repetitive element c1 sent by the sensor controller 31 at the timing of t1 immediately after the subsequently arriving reception period SRP positioned in the continuous transmission period TCP (YES in step S22 in FIG. 5B).

<2. Operation After the Stylus 100 has Detected the Sensor Controller 31>(Time t1 to t3)

When the stylus 100 detects the repetitive element c1, the stylus 100 generates the activation signal EN referred to above and subsequently continues the receiving operation (the process of decoding the received signal) beyond the reception period SRP (step S23 in FIG. 5B). If the sensor controller 31 sends the delimiter element STP while the stylus 100 is performing the receiving operation, the stylus 100 detects the delimiter element STP at subsequent time t2 (YES in step S24 in FIG. 5B). The stylus 100 refers to time t2 at which it detects the delimiter element STP, and generates a transmission and reception schedule for the control information c2, the position signal DS_pos, and the data signal DS_res. Specifically, as depicted in FIG. 4, the stylus 100 waits for the reception of the control information c2 based on the timing of time t2 (step S25 in FIG. 5B), and, if the control information c2 is received (YES in step S26 in FIG. 5B), generates the data signal DS_res (transmission data Res) depending on the received control information c2 and at the same time sends the position signal DS_pos (step S27 in FIG. 5B), and finally sends the generated data signal DS_res (step S28 in FIG. 5B).

As described above, the sensor controller 31 provides the reception period RDS after having sent the second control signal US_c2 and waits for the reception of the position signal DS_pos (step S14 in FIG. 5A), as described above. Having received the position signal DS_pos (YES in step S15 in FIG. 5A), the sensor controller 31 calculates the position (coordinate data x, y) of the stylus 100 on the basis of how the position signal DS_pos is received by the line-shaped electrodes 30X, 30Y depicted in FIG. 2, outputs the calculated position to the host processor 32 depicted in FIG. 1, provides the reception period RDS again, and waits for the reception of the data signal DS_res (step S16 in FIG. 5A). Having received the data signal DS_res, the sensor controller 31 extracts the transmission data Res described above from the received data signal DS_res and outputs the extracted transmission data Res to the host processor 32.

Even after having received the position signal DS_pos and the data signal DS_res from the stylus 100, the sensor controller 31 still repeats the transmission of the first control signal US_c1 and the second control signal US_c2 in the same manner as before. The stylus 100 also repeats the above operation. The sensor controller 31 receives the position signal DS_pos and the data signal DS_res from the stylus 100 each time the stylus 100 repeats the above operation, thereby calculating the position of the stylus 100 and acquiring the transmission data Res sent by the stylus 100.

Figure 10:
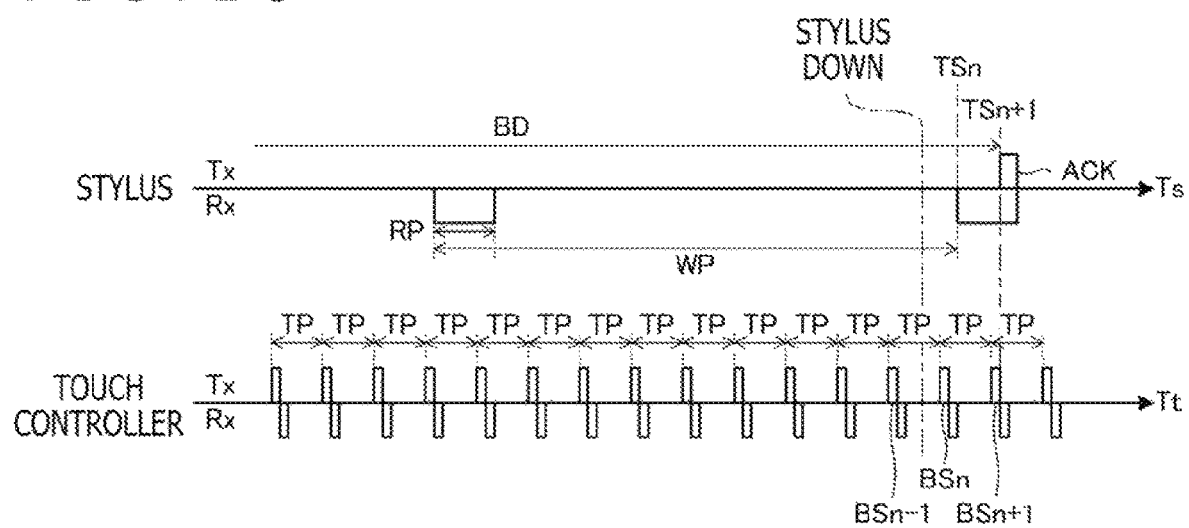
FIG. 10 is a diagram illustrative of a process of detecting a sensor controller in a bidirectional communication system according to the background art of the present disclosure.

With the system 1 according to the present embodiment, as described above, since the sensor controller 31 sends the repetitive element c1 repeatedly twice or more times, it is possible to make the ratio of the receiving operation execution time period of the stylus 100 to the total time period smaller than before, depending on the conventional value of RP/WP (see FIG. 10). Therefore, the amount of electric power consumed by the stylus 100, which is configured to detect the sensor controller 31 by receiving a signal sent by the sensor controller 31, before it detects the sensor controller 31 is reduced, while the maximum value of the time period (maximum waiting time period) required before the stylus 100 and the sensor controller 31 complete each other's detection after the stylus 100 has started approaching the sensor controller 31 is kept equal to or smaller than the conventional value.

In the present embodiment, the delimiter element STP is positioned at the beginning of the second control signal US_c2. However, the delimiter element STP may be positioned at the tail end of the first control signal US_c1. In either case, the system 1 according to the present embodiment operates in the same way.

Although the preferred embodiment of the present disclosure has been described above, the present disclosure is not limited to the embodiment, but can be reduced to practice in various forms without departing from the scope thereof.

For example, in the above embodiment, the sensor controller 31 sends the second control signal US_c2 including the control information c2 part, each time it sends the first control signal US_c1. However, in the pre-detection period BD, the sensor controller 31 may send the second control signal US_c2 up to its delimiter element STP portion only, and may send the control information c2 only after the stylus 100 has been detected. Furthermore, in the pre-detection period BD, the sensor controller 31 may send only the first control signal US_c1 (the repetitive element c1), and may send the second control signal US_c2 (the delimiter element STP and the control information c2) only after the stylus 100 has been detected. The former modification (first modification) and the latter modification (second modification) will be described in detail below with reference to the drawings.

Figure 6:
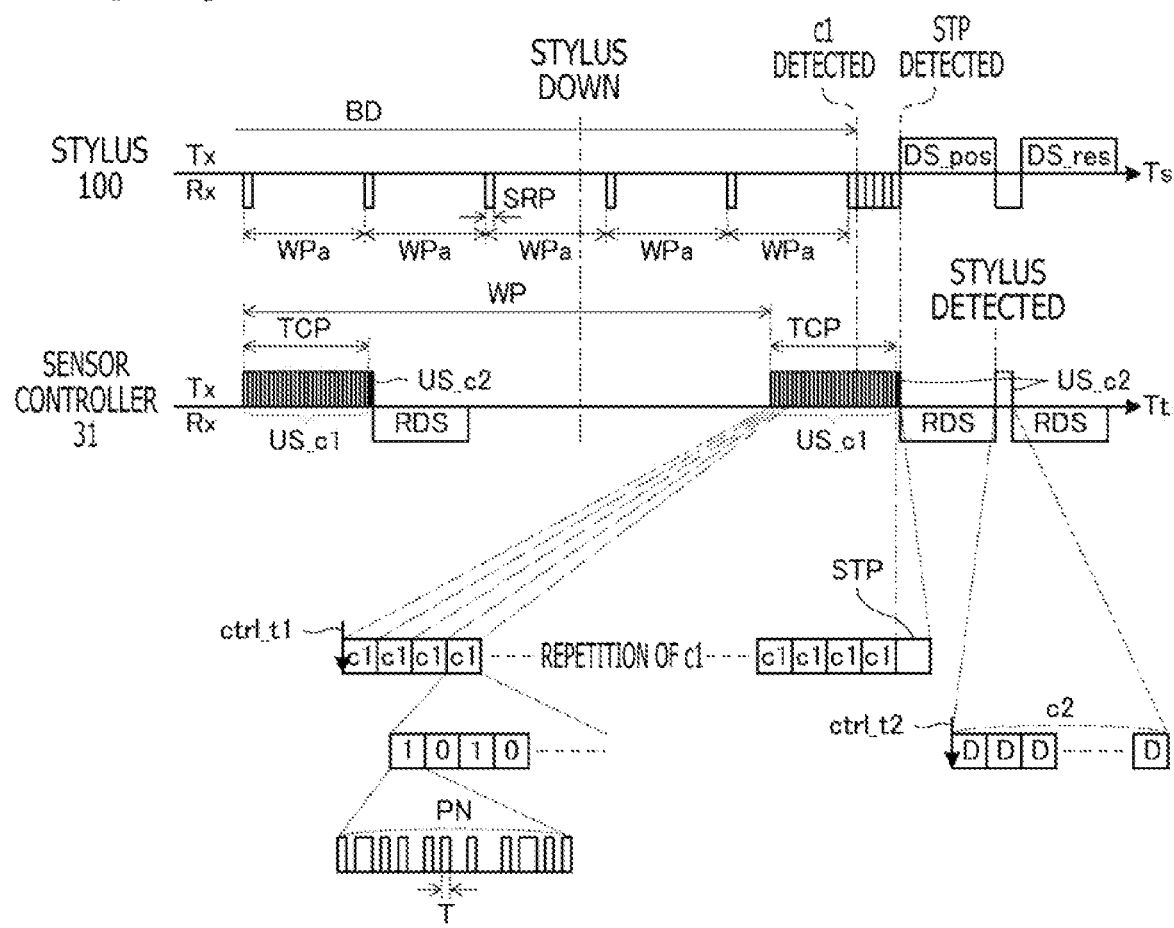
FIG. 6 is a timing chart illustrative of a chronological sequence of operations of a stylus 100 and a sensor controller 31 according to a first modification of the embodiment of the present disclosure.
Figure 7A:
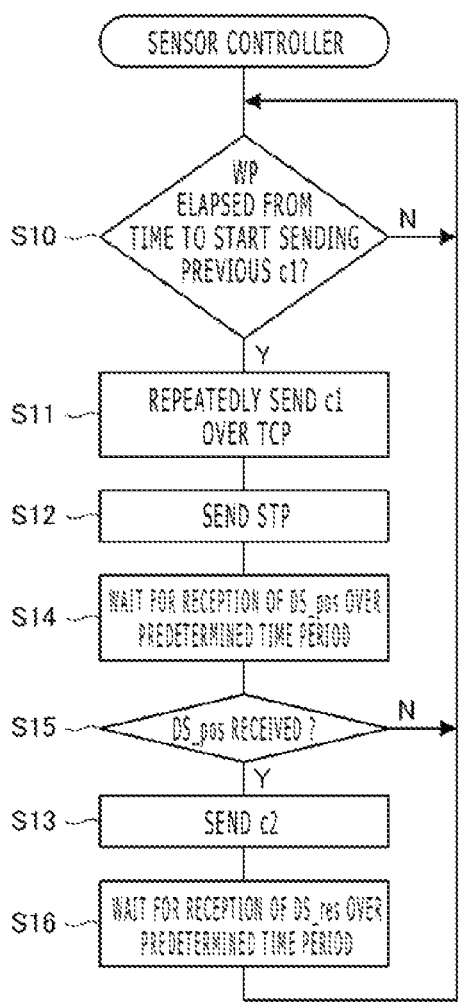
FIGS. 7A and 7B include flowcharts according to the first modification of the embodiment of the present disclosure.
Figure 7B:
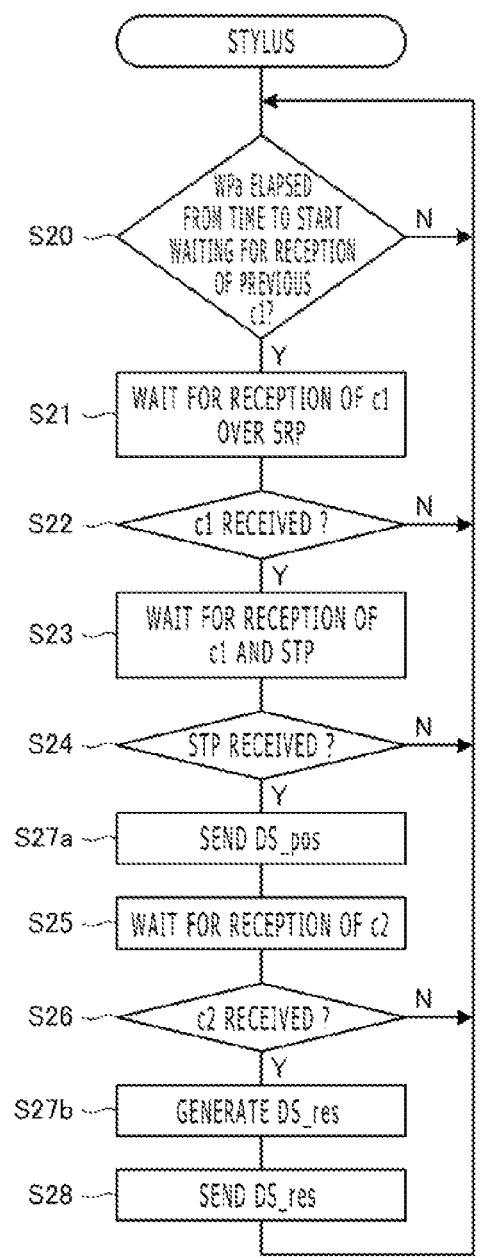

FIG. 6 is a timing chart illustrative of a chronological sequence of operations of the stylus 100 and the sensor controller 31 according to the first modification of the embodiment of the present disclosure. FIG. 7A is a flowchart depicting an operation sequence of the sensor controller 31 according to the present modification, and FIG. 7B is a flowchart depicting an operation sequence of the stylus 100 according to the present modification.

As depicted in FIG. 6, the sensor controller 31 according to the present modification does not send the control information c2 after having sent the delimiter element STP in the pre-detection period BD. If the position signal DS_pos is detected in the reception period RDS provided after the delimiter element STP has been sent, then the sensor controller 31 sends the control information c2 after the reception period RDS has elapsed, thereafter provides the reception period RDS again, and waits for the reception of the data signal DS_res from the stylus 100.

According to the processing flow of the sensor controller 31, as depicted in FIG. 7A, step S13 is carried out after step S15. According to the processing flow of the stylus 100, as depicted in FIG. 7B, step S27a for sending the position signal DS_pos is provided immediately after step S24, and the position signal DS_pos is not sent when the data signal DS_res is generated (step S27b in FIG. 7B).

According to the present modification, the sensor controller 31 is also able to send the second control signal US_c2 and receive the data signal DS_res. According to the present modification, consequently, the amount of electric power consumed by the stylus 100 before it detects the sensor controller 31 is reduced, while the maximum value of the time period (maximum waiting time period) required before the stylus 100 and the sensor controller 31 complete each other's detection after the stylus 100 has started approaching the sensor controller 31 is kept equal to or smaller than the conventional value.

Figure 8:
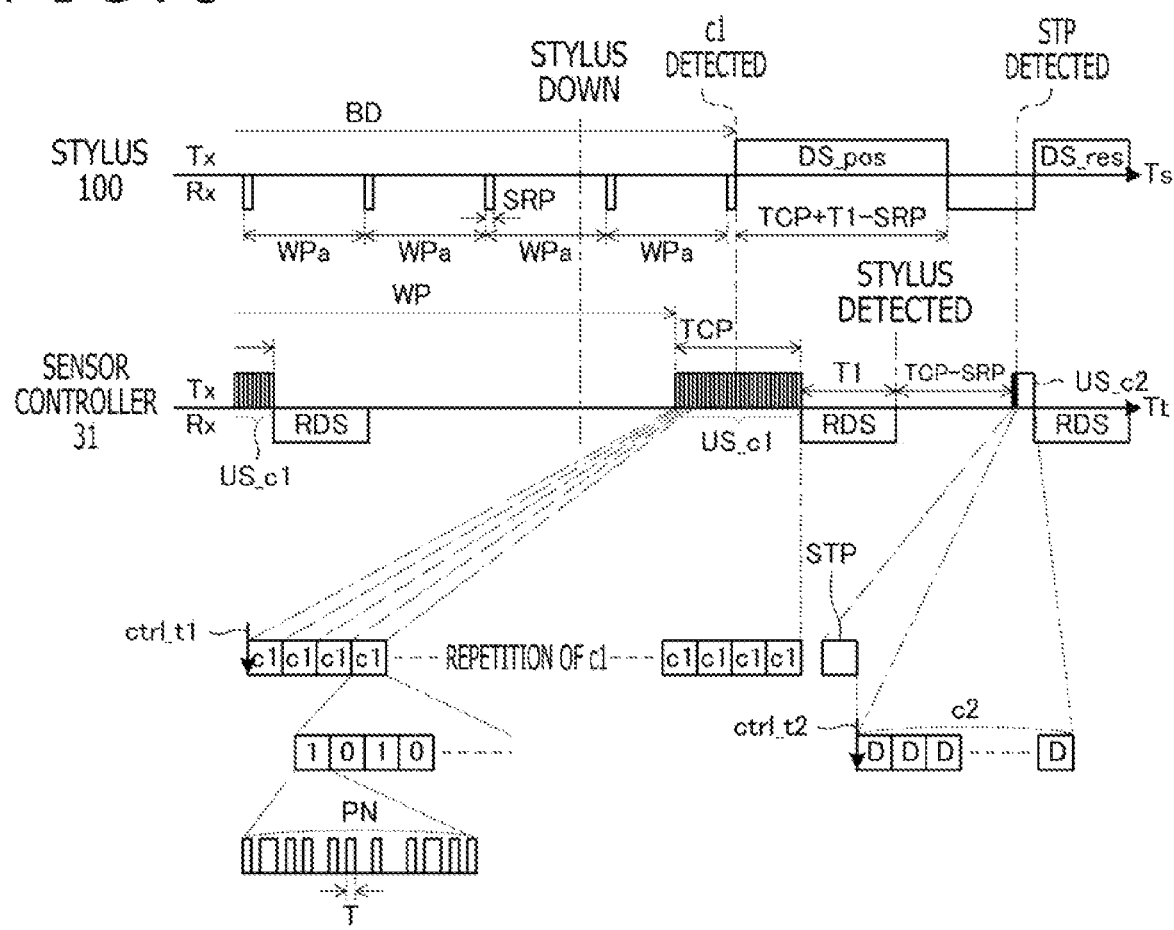
FIG. 8 is a timing chart illustrative of a chronological sequence of operation of a stylus 100 and a sensor controller 31 according to a second modification of the embodiment of the present disclosure.
Figure 9A:
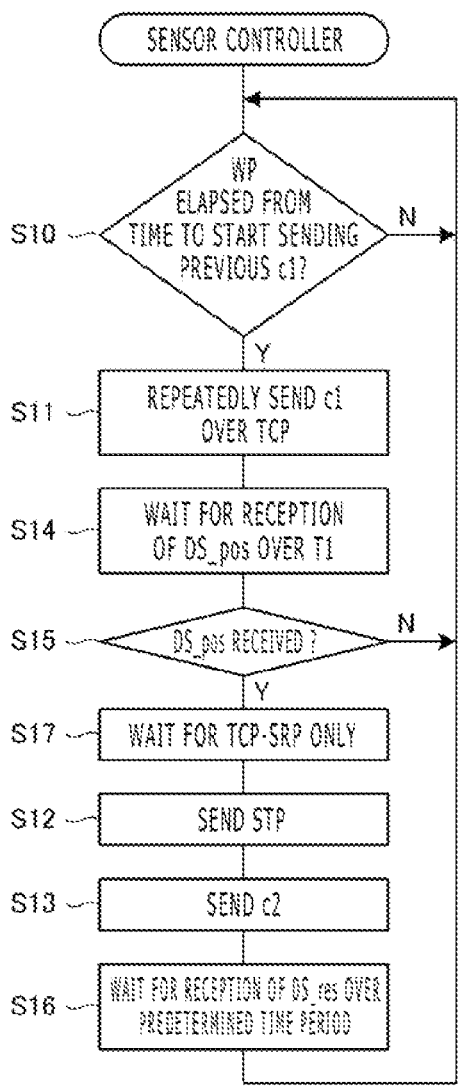
FIGS. 9A and 9B include flowcharts according to the second modification of the embodiment of the present disclosure.
Figure 9B:
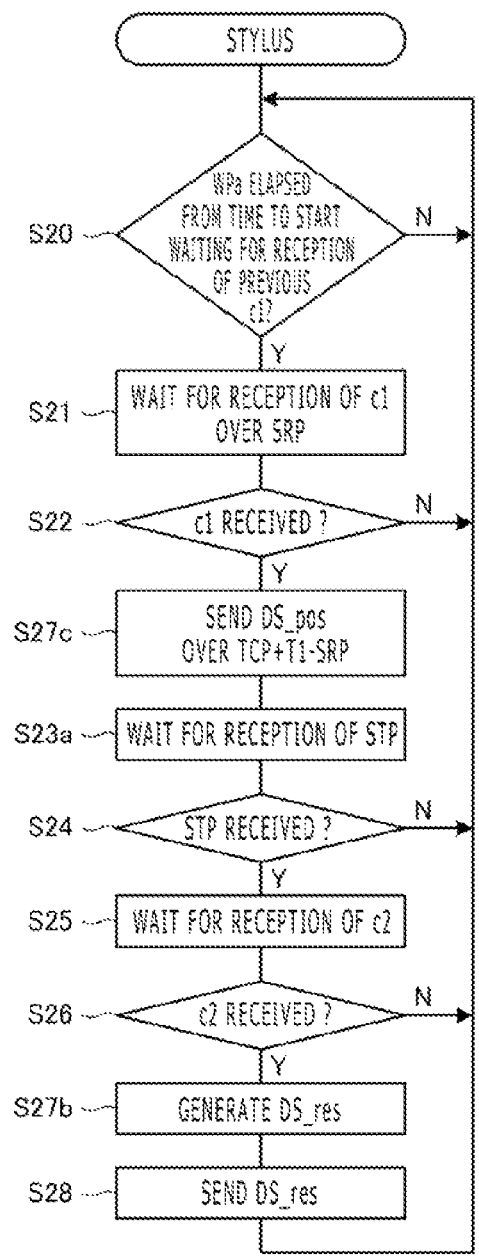

FIG. 8 is a timing chart illustrative of a chronological sequence of operation of the stylus 100 and the sensor controller 31 according to the second modification of the embodiment of the present disclosure. FIG. 9A is a flowchart depicting an operation sequence of the sensor controller 31 according to the present modification, and FIG. 9B is a flowchart depicting an operation sequence of the stylus 100 according to the present modification.

As depicted in FIG. 8, the sensor controller 31 according to the present modification sends only the first control signal US_c1 (repetitive element c1) in the pre-detection period BD. If the position signal DS_pos is detected in the reception period RDS provided after the first control signal US_c1 has been sent, then the sensor controller 31 sends the second control signal US_c2 (the delimiter element STP and the control information c2). Thereafter, the sensor controller 31 provides the reception period RDS again, and waits for the reception of the data signal DS_res from the stylus 100.

As depicted in FIG. 8, the stylus 100 according to the present modification is configured to send the position signal DS_pos immediately when it has detected the repetitive element c1 once. With the stylus 100 thus arranged, if it is assumed that the time length required for the sensor controller 31 to receive the position signal DS_pos is T1, then the stylus 100 is required to keep sending the position signal DS_pos over a time length TCP+T1-SRP, as depicted in FIG. 8. This is for the stylus 100 to keep sending the position signal DS_pos before the terminal end of the reception period RDS that is provided by the sensor controller 31 in order to receive the position signal DS_pos, even when the stylus 100 has received the first one of a plurality of repetitive elements c1 repeatedly sent by the sensor controller 31. Furthermore, the sensor controller 31 is required to start sending the delimiter element STP after having waited for a time length TCP-SRP after the reception period RDS for receiving the position signal DS_pos has ended. This is for the sensor controller 31 not to send the delimiter element STP while the stylus 100 is sending the position signal DS_pos (i.e., while the stylus 100 is unable to receive signals from the sensor controller 31), even when the stylus 100 has received the last one of a plurality of repetitive elements c1 repeatedly sent by the sensor controller 31.

According to the processing flow of the sensor controller 31, as depicted in FIG. 9A, step S17 is provided for the sensor controller 31 to wait over the time length TCP-SRP after step S15, and steps S12 and S13 are carried out after step S17. According to the processing flow of the stylus 100, as depicted in FIG. 9B, the position signal DS_pos is sent immediately after step S22 (step S27c in FIG. 9B), and the transmission of the position signal DS_pos is continued over the time length TCP+T1-SRP.

According to the present modification, the sensor controller 31 is also able to send the second control signal US_c2 and receive the data signal DS_res. According to the present modification, consequently, the amount of electric power consumed by the stylus 100 before it detects the sensor controller 31 is reduced, while the maximum value of the time period (maximum waiting time period) required before the stylus 100 and the sensor controller 31 complete each other's detection after the stylus 100 has started approaching the sensor controller 31 is kept equal to or smaller than the conventional value.

In addition, the sensor controller 31 may make the number of repetitive elements c1 that make up the first control signal US_c1 sent after it has detected the stylus 100 (after having received the position signal DS_pos from the stylus 100), smaller than the number of repetitive elements c1 that make up the first control signal US_c1 sent before it detects the stylus 100. In this manner, it is possible to reduce the electric power consumed by the sensor controller 31 by an amount depending on the reduced number of repetitive elements c1. In this case, if the sensor controller 31 does not receive a signal from the stylus 100 over a predetermined period or by a predetermined number of times, then the number of repetitive elements c1 that make up the first control signal US_c1 should preferably be restored (increased). This makes it possible to avoid a situation in which the stylus 100 is unable to receive the first control signal US_c1 forever when the stylus 100 approaches the sensor 30 next.

The sensor controller 31 may stop sending the first control signal US_c1 after having detected the stylus 100 (after having received the position signal DS_pos from the stylus 100). In other words, the sensor controller 31 may send only the second control signal US_c2 subsequently. The sensor controller 31 in this case needs to resume sending the first control signal US_c1 in order to make the stylus 100 detectable again if the sensor controller 31 does not receive a signal from the stylus 100 over a predetermined period or by a predetermined number of times.

The sensor controller 31 may send the second control signal US_c2 after a gap period of a predetermined time length has elapsed from the transmission of the first control signal US_c1. In this manner, the stylus 100 is able to receive the second control signal US_c2 in a sufficient amount of time.

The second control signal US_c2 may include, in addition to an arbitrary value (or bit string) making up the control information c2, a first error-detecting value (or bit string) derived on the basis of that value (or bit string). The first error-detecting value (or bit string) should preferably be derived using a cyclic redundancy check, for example. The first error-detecting value (or bit string) is derived on the basis of only the control information c2, and the repetitive element c1 and the delimiter element STP that make up the first control signal US_c1 are not involved in deriving first error-detecting value (or bit string).

If the second control signal US_c2 is configured as including the first error-detecting value (or bit string), then the stylus 100 performs a process of deriving a second error-detecting value (or bit string) based on the received second control signal US_c2. Specifically, the stylus 100 performs the same operation as the operation used for the sensor controller 31 to derive the first error-detecting value (or bit string), on (information like) the control information c2 extracted from the second control signal US_c2, thereby performing a process of deriving a second error-detecting value (or bit string). Then, the stylus 100 compares the first error-detecting value (or bit string) (or like information) included in the received second control signal US_c2 and the derived second error-detecting value (or bit string) with each other. If the compared values agree with each other, then the stylus 100 decides that it has received the control information c2 properly, and goes to a next process. If the compared values do not agree with each other, then the stylus 100 discards the extracted control information c2, and waits for the reception of a next second control signal US_c2. In this manner, the stylus 100 is capable of receiving only the correct control information c2 from the sensor controller 31.

Moreover, the sensor controller 31 may generate the first control signal US_c1 to be sent immediately before the second control signal US_c2 so that the total bit length of the first control signal US_c1 and the second control signal US_c2 is constant depending on the length of the second control signal US_c2 that is of a variable length. Specifically, the sensor controller 31 may adjust the length of the first control signal US_c1 by increasing or reducing the number of repetitions of the repetitive element c1. The bit length of signals sent by the sensor controller 31 can thus be kept constant at all times.

With the system 1, the stylus 100, the sensor controller 31, and a method carried out by them according to the present disclosure, as described above, the sensor controller 31 sends the repetitive element repeatedly twice or more times, and the stylus 100 detects the sensor controller 31 by detecting one of the repeated repetitive elements. Therefore, the time period in which the stylus 100 has to carry out the receiving operation can be shortened, reducing the ratio of the receiving operation execution time period to the overall time period. Consequently, the amount of electric power consumed by the stylus 100, which is configured to detect the sensor controller 31 by receiving a signal sent by the sensor controller 31, before it detects the sensor controller 31 is reduced, while maintaining a response time period before the stylus 100 detects the sensor controller 31 reasonably short.

In the stylus 100, the controller 90, rather than the receiver 71, may determine whether the received signal includes the repetitive element c1 or not. Whether the received signal includes the repetitive element c1 or not may be determined by comparing the signal level of the received signal and the signal level of a waveform shape stored in advance, rather than comparing the value of the decoded symbol with the value of the symbol shared with the stylus 100 in advance.

In the sensor controller 31, the pattern of the values of symbols of the delimiter element STP is described as being supplied in the transmitter 60. However, it may be supplied by the MCU 80. The MCU 80 and the logic unit 70 may be implemented in an integrated processor.

The N symbols may be interpreted as N codes or N detection-bit patterns, and the length of N symbols may be interpreted as the time period of a signal for sending the values of the N codes or a bit string included in the N detection-bit patterns.

While the system according to the present disclosure has been illustrated as a system for sending signals via a capacitive coupling, the present disclosure is applicable to a stylus and a sensor controller which are incorporated in a system where they can detect each other at a distance up to several tens of millimeters because the level of a signal attenuates greatly over a distance.

DESCRIPTION OF REFERENCE SYMBOLS

1 System
3 Electronic device
20 Core body
20a Distal end
21 Electrode
23 Pen pressure detection sensor
24 Circuit board
25 Power supply
30 Sensor
30X, 30Y Line-shaped electrode
31 Sensor controller
32 Host processor
40 Selecting section
41x, 41y Conductor selecting circuit
44x, 44y, 62 Switch
49 Detecting circuit
50 Receiver
51 Amplifying circuit
52 Detecting circuit
53 Analog-to-digital converter
60 Transmitter
61 Control signal supply circuit
63 Modulation circuit (direct spread section)
64 Spread code hold section
65 Transmission guard section
70 Logic unit
71 Receiver
71a Waveform regenerating circuit
71b Correlation operator
73 Modulation circuit
74 Voltage boosting circuit
75 Transmitter
90 Controller
100 Stylus
BS Beacon signal
c1 Repetitive element
c2 Control information
DS Downlink signal
DS_pos Position signal DS_res Data signal
EN Activation signal
PN Spread code
RDS, SRP Reception period
STP Delimiter element
SW Switch
TCP Continuous transmission period
US Control signal
US_c1 First control signal
US_c2 Second control signal
WP, WPa Period

The invention claimed is:

1. A method of a stylus detecting a sensor controller in a system which includes the stylus and the sensor controller for sending signals via a capacitive coupling, comprising:
a second transmission step, in which the sensor controller sends a second control signal including a symbol that represents a value not shared with the stylus in advance;
a first transmission step, prior to the second transmission step, in which the sensor controller sends a first control signal including a repetition by M (M is an integer of 2 or larger) times, of a repetitive element made up of N (N is an integer of 1 or larger) symbols whose values are shared with the stylus; and
a detection step, in which the stylus performs a receiving operation over a reception period longer than a length of the N symbols and shorter than a length of N multiplied by M, determines whether one of the repetitive element is included in a signal received in the reception period, and detects the sensor controller depending on a result of the determination.

2. The method according to claim 1, wherein the detecting step performs the receiving operation intermittently at a constant period.

3. The method according to claim 2, wherein the length of N multiplied by M is longer than the constant period.

4. The method according to claim 1, wherein a combination of N number of symbols starting from a beginning of the second control signal is different from a combination of the N symbols that make up the repetitive element.

5. The method according to claim 1, wherein a delimiter element distinguishable from the repetitive element and having a value shared with the stylus in advance is disposed at the beginning of the second control signal.

6. The method according to claim 5, wherein a number of symbols that make up the delimiter element is equal to a number of symbols that make up the repetitive element.

7. The method according to claim 5, wherein the repetitive element is made up of the N symbols respectively representing the same first value; and the delimiter element includes at least one symbol representing a second value different from the first values.

8. The method according to claim 5, wherein the repetitive element is made up of N symbols including a plurality of symbols respectively representing values different from each other; and the delimiter element is made up only of symbols representing the same value.

9. The method according to claim 5, further comprising:
a step in which the stylus having received the second control signal performs an operation based on a value represented by one or more symbols received subsequently to the delimiter element.

10. The method according to claim 9, further comprising:
a third transmission step in which, after having detected the sensor controller, the stylus continues the receiving operation beyond the reception period, determines whether the delimiter element is included in the received signal, and, if the delimiter element is detected, sends a position signal at a timing based on a time at which the delimiter element is detected.

11. The method according to claim 1, wherein a delimiter element distinguishable from the repetitive element and having a value shared with the stylus in advance is disposed at a tail end of the first control signal.

12. The method according to claim 1, further comprising:
a third transmission step in which, after having detected the sensor controller by detecting the repetitive element, the stylus immediately sends a position signal without waiting to receive the repetitive element which subsequently arrives.

13. The method according to claim 1, wherein the first transmission step includes a step of spreading each of the symbols making up the first control signal with a predetermined code string; and
the detection step performs a correlation operation on the signal received in the reception period and the predetermined code string, and makes the determination depending on a result of the correlation operation.

14. The method according to claim 1, wherein the second transmission step is carried out after the stylus has sent a predetermined signal to the sensor controller and the sensor controller has detected the predetermined signal.

15. The method according to claim 1, further comprising:
a processor activation step, in which the stylus changes an operation mode of a processor that operates on the basis of the second control signal after the sensor controller has been detected in the detection step;
a transmission method control step, in which the stylus controls a transmission method for a data signal to be sent to the sensor controller on the basis of the second control signal received from the sensor controller; and
a fourth transmission step, in which the stylus sends the data signal according to the determined transmission method.

16. The method according to claim 15, wherein the transmission method control step controls one or more the content of information sent on the data signal, a timing to send the data signal, and a frequency used to send the data signal.

17. The method according to claim 1, wherein the symbol represent values of a predetermined number of bits.

18. The method according to claim 1, wherein the symbol represents values of a predetermined number of bits, or represents one or more values each not corresponding to a particular bit string;
the repetitive element is made up of N symbols each representing the one or more values; and
the value not shared with the stylus in advance is made up of a plurality of symbols each representing values of the predetermined number of bits.

19. The method according to claim 1, wherein the first transmission step stops sending the first control signal in response to the detection of the sensor controller in the detection step.

20. The method according to claim 19, wherein the first transmission step resumes sending the first control signal when a signal from the stylus is not received over a predetermined period or for a predetermined number of times.

21. The method according to claim 1, wherein
the stylus and the sensor controller each store an associating relationship between a plurality of commands, respectively representing contents of instructions from the sensor controller to the stylus, and values or bit strings that are different from command to command;
the second control signal is a signal for sending one or more of the commands; and
the second transmission step generates the second control signal based on the associating relationship.

22. A stylus for performing communication with a sensor controller via a coupling capacitance, wherein the sensor controller sends a signal to the stylus during a continuous transmission period, the stylus comprising:
a receiver which, in operation,
receives the signal over a reception period which is longer than a length of N (N is an integer of 1 or larger) symbols and shorter than the continuous transmission period;
determines whether one repetitive element, which includes values of the N symbols that are shared with the sensor controller in advance, is included in the received signal;
successively receives the signal over the reception period at constant intervals if the repetitive element is not included; and
issues an activation signal if the repetitive element is included; and
a controller which, in operation, performs a process of sending a signal to the sensor controller in response to the activation signal.

23. A sensor controller which uses a sensor connected thereto, for sending control information to a stylus via a capacitive coupling between the sensor and the stylus, and receiving a signal sent from the stylus in response to the control information, wherein the stylus performs a receiving operation in a predetermined period, determines whether a pattern of a value of one symbol is included in a signal received in the reception period, and detects the sensor controller depending on a result of the determination, the sensor controller comprising:
a transmitter which, in operation, generates and sends a control signal based on the value of the supplied symbol; and
a controller which, in operation, controls the transmitter to send N (N is an integer of 1 or larger) symbols, shared with the stylus in advance, repeatedly over a period longer than the predetermined period.

* * * * *